(12) United States Patent
Shlyunkin et al.

(10) Patent No.: US 10,891,340 B2
(45) Date of Patent: Jan. 12, 2021

(54) METHOD OF AND SYSTEM FOR UPDATING SEARCH INDEX DATABASE

(71) Applicant: YANDEX EUROPE AG, Lucerne (CH)

(72) Inventors: Aleksey Valerievich Shlyunkin, Sortavala (RU); Alexander Pavlovich Fokin, Izhevsk (RU); Petr Sergeevich Popov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 69 days.

(21) Appl. No.: 16/505,110

(22) Filed: Jul. 8, 2019

(65) Prior Publication Data
US 2020/0159783 A1    May 21, 2020

(30) Foreign Application Priority Data

Nov. 16, 2018    (RU)  ................................. 2018140528

(51) Int. Cl.
*G06F 16/951*      (2019.01)
*G06F 16/93*      (2019.01)
(Continued)

(52) U.S. Cl.
CPC ........ *G06F 16/951* (2019.01); *G06F 16/2272* (2019.01); *G06F 16/2379* (2019.01); *G06F 16/93* (2019.01)

(58) Field of Classification Search
CPC ........ G06F 16/951; G06F 16/93; G06F 16/23; G06F 16/22
(Continued)

(56) References Cited

U.S. PATENT DOCUMENTS 7,702,614 B1 * 4/2010 Shah .................... G06F 16/319
                                                               707/741
8,131,691 B1    3/2012 Nagaralu et al.
(Continued)

FOREIGN PATENT DOCUMENTS

CN          103198108 B     8/2016
JP          2003141136 A     5/2003
(Continued)

OTHER PUBLICATIONS

Russian Search Report dated May 22, 2020 issued in respect of the Russian Patent Application No. RU2018140528.
(Continued)

*Primary Examiner* — Kuen S Lu
(74) *Attorney, Agent, or Firm* — BCF LLP

(57) ABSTRACT

A method and a system for updating a search index divided into a plurality of chunks, each chunk including a portion of a plurality of documents, comprising: receiving a request to update a set of documents including deletion of a first subset of documents, computing for each given chunk of a set of chunks, each given chunk including at least one document of the first subset: an active size of a set of active documents, the set of active documents not including the at least one document, a total size, the total size not including the at least one document and a ratio of the active to the total size, duplicating, based on the ratio, a subset of chunks to obtain a subset of candidate chunks, updating the set of documents in the subset of candidate chunks, replacing the subset of chunks with the subset of candidate chunks.

26 Claims, 6 Drawing Sheets

(51) Int. Cl.
  *G06F 16/22* (2019.01)
  *G06F 16/23* (2019.01)

(58) Field of Classification Search
  USPC .......................................................... 707/711
  See application file for complete search history.

(56) References Cited

U.S. PATENT DOCUMENTS

| | | | |
|---|---|---|---|
| 8,224,841 | B2 | 7/2012 | Permandla et al. |
| 8,423,885 | B1 | 4/2013 | Kupke et al. |
| 8,655,886 | B1 | 2/2014 | Gross |
| 8,949,247 | B2 * | 2/2015 | Torbjornsen .......... G06F 16/319 707/742 |
| 9,430,543 | B2 | 8/2016 | Srivastava et al. |
| 9,665,605 | B2 | 5/2017 | Kogan et al. |
| 9,836,541 | B2 | 12/2017 | Pidduck et al. |
| 10,417,190 | B1 * | 9/2019 | Donlan ................... G06F 16/10 |
| 2003/0101183 | A1 | 5/2003 | Kabra et al. |
| 2003/0135495 | A1 | 7/2003 | Vagnozzi |
| 2009/0193406 | A1 * | 7/2009 | Williams .............. G06F 16/951 717/168 |
| 2012/0317105 | A1 | 12/2012 | Bai et al. |
| 2015/0356314 | A1 * | 12/2015 | Kumar ................ G06F 16/2228 713/165 |
| 2016/0342612 | A1 * | 11/2016 | Srivastava ........... G06F 16/162 |
| 2017/0068678 | A1 | 3/2017 | Tripathi et al. |
| 2017/0199908 | A1 * | 7/2017 | Gavrin .................... G06F 16/31 |
| 2019/0227878 | A1 * | 7/2019 | Agarwal ................. G06F 8/658 |

FOREIGN PATENT DOCUMENTS

| | | |
|---|---|---|
| RU | 2398272 C2 | 8/2010 |
| WO | 2003081462 A2 | 10/2003 |

OTHER PUBLICATIONS

English Abstract for the publication JP2003141136 (A), retrieved from Espacenet on Jul. 30, 2018.
English Abstract for the publication CN103198108 (A) (related to CN103198108 (B), retrieved from Espacenet on Jul. 30, 2018.

\* cited by examiner

600

```
START
  ↓
```

| | |
|---|---|
| receiving a request to update a set of documents in the search index, the request to update the set of documents including:<br><br>deletion of a first subset of documents, and<br><br>addition of a second subset of documents to the plurality of documents in the plurality of chunks | 602 |

↓

| | |
|---|---|
| computing for each given chunk of a set of chunks from the plurality of chunks, each given chunk including at least one document of the first subset of documents:<br><br>a respective updated active size of a respective set of active documents of the respective portion of the plurality of documents in the given chunk, the respective set of active documents not including the at least one document of the first subset of documents to delete,<br><br>a respective updated total size of the respective portion of the plurality of documents in the given chunk, the respective portion of the plurality of documents not including the at least one document of the first subset of documents to delete, and<br><br>a respective ratio of the respective updated active size to the respective updated total size | 604 |

↓

| | |
|---|---|
| duplicating, based on the respective ratio, a subset of chunks from the set of chunks to obtain a subset of candidate chunks | 606 |

↓

| | |
|---|---|
| updating, by the server, at least a portion of the set of documents in the subset of candidate chunks, the updating comprising:<br><br>removing, by the server, from the subset of candidate chunks, the first subset of documents for deletion,<br><br>adding, by the server, remaining documents in the subset of candidate chunks to the second subset of documents,<br><br>distributing, by the server, the second subset of documents in the subset of candidate chunks | 608 |

↓

| | |
|---|---|
| replacing, by the server, the subset of chunks with the subset of candidate chunks | 610 |

↓

END

FIG. 6

METHOD OF AND SYSTEM FOR UPDATING SEARCH INDEX DATABASE

CROSS-REFERENCE

The present application claims priority to Russian Patent Application No. 2018140528, entitled "Method of and System for Updating Search Index Database", filed Nov. 16, 2018, the entirety of which is incorporated herein by reference.

FIELD

The present technology relates to information retrieval in general and, more specifically, to a method and a system for updating a search index database of a search engine server.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access a resource on the communication network by two principle means. The given user can access a particular resource directly, either by typing an address of the resource (typically an URL or Universal Resource Locators or by clicking a link in an electronic message or in another web resource. Alternatively, the given user may conduct a search using a search engine to locate a resource of interest. The latter is particularly suitable in those circumstances, where the given user knows a topic of interest, but does not know the exact address of the resource she is interested in.

Briefly speaking, a search engine generally operates in three phases: web crawling, indexing, and searching. During the web crawling phase, the search engine executes a plurality of web crawlers known also as "spiders", which are computer programs that "crawl" or browse the World Wide Web (Web) and download copies of digital documents such as web pages, which are stored in a storage medium. During the indexing phase, the stored digital documents are processed to extract information, and the extracted information is used for building a search index. The search index stores the processed information in a suitable format for allowing fast retrieval. Typically, the digital documents are indexed according to some or all of the terms contained in the digital document, which terms can potentially match one or more future search query terms. A so-called inverted index of the data collection is maintained and updated by the system, to be then used in execution of a given search query. The inverted index comprises a plurality of "posting lists", where every posting list corresponds to a term and contains references to data items comprising that search term.

During the searching phase, a user typically enters and submits a search query in a field on the search engine, the search engine retrieves digital documents relevant to the search terms included in the search query from the search index, and a machine learning algorithm (MLA) typically ranks the digital documents based on their computed relevancy to the terms of the search query. The ranked digital documents are then provided to the user in a search engine results pages (SERPs).

U.S. Patent Application Publication No. 2009/0193406 A1 published on Jul. 30, 2009 to James Charles Williams and titled "Bulk Search Index Updates" teaches performing bulk updates of a search index for an information repository. In embodiments, a batched set of update requests is run and a set of documents to be updated based on the set of requests is identified. In embodiments, a bulk update method to use is selected based on an estimate of the cost of performing the bulk update. In embodiments, a bulk update method based on updating only the indexes of the documents to be updated may be used instead of a bulk update method that involves re-indexing the full set of documents in the repository.

U.S. Pat. No. 9,430,543 B2 granted on Aug. 30, 2016 to Walmart and titled "Incrementally updating a large key-value store" teaches methods, systems, and computer program products for incrementally updating a large key-value store that can include a computer-implemented method of updating a master database comprising refreshing a refresh set of oldest entries in the master database, merging an emergency set of entries in an emergency database into the master database, and deleting the emergency set of entries from the emergency database. In some embodiments, the computer-implemented method can further comprise merging a changed set of entries in a changed database into the master database and deleting the changed set of entries from the changed database. Other embodiments of related methods and systems are also provided.

U.S. Patent Application Publication No. 2003/101183 A1 published on May 29, 2003 to QUIG Inc, and Kanisa Inc. and titled "Information retrieval index allowing updating while in use" teaches a reverse index useful for identifying documents in information retrieval searches used concurrently for indexing while it is updated with new documents. Interruption to the use of the index is kept to a manageable level by partitioning the index and updating only single partitions of the index at a given time and further by bifurcating the index into a high speed supplemental portion that may be corrected concurrently on a real-time basis and which is periodically merged with the larger main portion. These two structures are merged during reading after brief locking, with pointer redirection.

SUMMARY

It is an object of the present technology to ameliorate at least some of the inconveniences present in the prior art.

The number of pages on the Web is growing exponentially, and it is estimated that there are more than tens of trillions of documents available on the Web at the moment. Generally, only a segment of the available documents on the Web are indexed by search engines in a search index, as a majority of the documents are in the "Deep Web" and/or are not indexed for various reasons. Nonetheless, web crawlers need to crawl and save billions of documents, where only a portion of the saved documents are processed and indexed, as processing and indexing the documents for building a search index is a computationally expensive task due to, among other factors, a trade-off between the constant growth of the number of documents on the Web, and the computational capacity that is required to process and store the documents by the search engine datacenters.

Further, the search index must be updated frequently to add new documents that may be relevant to users of the search engine, to delete documents that may be outdated, not presented frequently or at all in response to queries submitted by users, and/or that do not receive any user interactions because of their low relevancy to queries.

Developers of the present technology have appreciated that prior art approaches for updating a search index may be strenuous and resource intensive, as one or more working copies of the search index must be stored and used to provide users with search results in response to queries in real-time, while another "updated" copy of the search index must also be stored while it is updated, thus requiring maintaining at least two copies of the search index, while only one is used actively, which demands storage and computational resources.

Thus, embodiments of the present technology are directed to a method and a system for updating a search index database.

It is contemplated that the system as envisaged by the developers of the present technology may allow managing the limited amount of processing power and storage that can be allocated for maintaining and updating a search index, by separating the search index into portions or "chunks", and by selectively updating documents in the portions based on different criteria, such as a size of "active" documents in the chunks, a size of documents to add and to delete, available storage space, among other factors.

In accordance with a first broad aspect of the present technology, there is provided a computer-implemented method for dynamically updating a search index of a server, the search index being divided into a plurality of chunks, each chunk of the plurality of chunks including a respective portion of a plurality of documents, the method executable by the server, the method comprising: receiving, by the server, a request to update a set of documents in the search index, the request to update the set of documents including deletion of a first subset of documents, computing, by the server, for each given chunk of a set of chunks from the plurality of chunks, each given chunk including at least one document of the first subset of documents: a respective updated active size of a respective set of active documents of the respective portion of the plurality of documents in the given chunk, the respective set of active documents not including the at least one document of the first subset of documents to delete, a respective updated total size of the respective portion of the plurality of documents in the given chunk, the respective portion of the plurality of documents not including the at least one document of the first subset of documents to delete, and a respective ratio of the respective updated active size to the respective updated total size, duplicating, by the server, based on the respective ratio, a subset of chunks from the set of chunks to obtain a subset of candidate chunks, updating, by the server, at least a portion of the set of documents in the subset of candidate chunks, replacing, by the server, the subset of chunks with the subset of candidate chunks.

In some embodiments of the method, the request to update the set of documents in the search index further comprises: addition of a second subset of documents to the plurality of documents in the plurality of chunks.

In some embodiments of the method, the updating at least the portion of the set of documents in the subset of chunks comprises: removing, by the server, from the subset of candidate chunks, the first subset of documents for deletion, and distributing, by the server, the second subset of documents in the subset of candidate chunks.

In some embodiments of the method, the method further comprises, prior to the distributing the second subset of documents in the subset of candidate chunks: adding, by the server, remaining documents in the subset of candidate chunks to the second subset of documents.

In some embodiments of the method, the subset of candidate chunks comprises a predetermined number of chunks having a respective lowest ratio.

In some embodiments of the method, each respective document of the plurality of documents of the search index has: a respective size, a location in a respective chunk, and an identifier of the respective chunk.

In some embodiments of the method, the distributing the second subset of documents in the subset of candidate chunks comprises, for a given document in the second subset of documents: updating, by the server, the identifier of the respective chunk of the given document, and updating, by the server, the location of the given document in the respective chunk.

In some embodiments of the method: the set of documents to update is associated with an update size, and the update size is below a predetermined update size threshold.

In some embodiments of the method, each given chunk of the plurality of chunks includes: a respective set of active documents having a respective active size, a respective set of inactive documents having a respective inactive size, and the respective portion of the plurality of documents having a respective total size.

In some embodiments of the method, the method further comprises, prior to the computing: determining, by the server, if the update size is above the predetermined update size threshold, and in response to the update size being above the predetermined update size threshold: dividing, by the server, the set of documents to update into at least two subsets of documents, such that each of the at least two subsets is below the predetermined change size threshold, and performing, by the server, the computing, the duplicating, and the updating for each of the at least two subsets.

In some embodiments of the method, the computing, the duplicating, and the updating is executed offline.

In some embodiments of the method, the server is a search engine server, and each respective set of inactive documents in the plurality of chunks of the search index includes at least one of: documents having received no user interactions in response to any query during a predetermined period of time, and documents not having been presented in response to any query during the predetermined period of time.

In some embodiments of the method, the server is connected to a storage medium, the storage medium including a first portion, and a second portion, the search index is stored in the first portion, the subset of candidate chunks is stored in the second portion, and a size limit of the first portion is below a size limit of the second portion.

In accordance with a second broad aspect of the present technology, there is provided a system for dynamically updating a search index, the search index being divided into a plurality of chunks, each chunk of the plurality of chunks including a respective portion of a plurality of documents, the system comprising: a processor, a non-transitory computer-readable medium comprising instructions, the processor, upon executing the instructions, being configured to: receive a request to update a set of documents in the search index, the request to update the set of documents including deletion of a first subset of documents, compute for each given chunk of a set of chunks from the plurality of chunks, each given chunk including at least one document of the first subset of documents: a respective updated active size of a respective set of active documents of the respective portion of the plurality of documents in the given chunk, the respective set of active documents not including the at least one document of the first subset of documents to delete, a respective updated total size of the respective portion of the plurality of documents in the given chunk, the respective portion of the plurality of documents not including the at least one document of the first subset of documents to delete, and a respective ratio of the respective updated active size to the respective updated total size, duplicate, based on the respective ratio, a subset of chunks from the set of chunks to obtain a subset of candidate chunks, update at least a portion of the set of documents in the subset of candidate chunks, replace the subset of chunks with the subset of candidate chunks.

In some embodiments of the system, the request to update the set of documents in the search index further comprises: addition of a second subset of documents to the plurality of documents in the plurality of chunks.

In some embodiments of the system, to update at least the portion of the set of documents in the subset of chunks the processor is configured to: remove from the subset of candidate chunks, the first subset of documents for deletion, and distribute the second subset of documents in the subset of candidate chunks.

In some embodiments of the system, the processor is further configured to, prior to the distributing the second subset of documents in the subset of candidate chunks: add remaining documents in the subset of candidate chunks to the second subset of documents.

In some embodiments of the system, the subset of candidate chunks comprises a predetermined number of chunks having a respective lowest ratio.

In some embodiments of the system, each respective document of the plurality of documents of the search index has: a respective size, a location in a respective chunk, and an identifier of the respective chunk.

In some embodiments of the system, to distribute the second subset of documents in the subset of candidate chunks the processor is configured to, for a given document in the second subset of documents: update the identifier of the respective chunk of the given document, and update the location of the given document in the respective chunk.

In some embodiments of the system, the set of documents to update is associated with an update size, and the update size is below a predetermined update size threshold.

In some embodiments of the system, each given chunk of the plurality of chunks includes: a respective set of active documents having a respective active size, a respective set of inactive documents having a respective inactive size, and the respective portion of the plurality of documents having a respective total size.

In some embodiments of the system, wherein the system is further configured to, prior to the computing: determine if the update size is above the predetermined update size threshold, and in response to the update size being above the predetermined update size threshold: divide the set of documents to update into at least two subsets of documents, such that each of the at least two subsets is below the predetermined change size threshold, and perform the computing, the duplicating, and the updating for each of the at least two subsets.

In some embodiments of the system, the computing, the duplicating, and the updating is executed offline.

In some embodiments of the system, the server is a search engine server, and each respective set of inactive documents in the plurality of chunks of the search index includes at least one of: documents having received no user interactions in response to any query during a predetermined period of time, and documents not having been presented in response to any query during the predetermined period of time In some embodiments of the system, wherein: the system is connected to a storage medium, the storage medium including a first portion, and a second portion, the search index is stored in the first portion, the subset of candidate chunks is stored in the second portion, and a size limit of the first portion is below a size limit of the second portion.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, the expression "plurality of search results" is intended to include a set of more than one search result, where general (e.g., Web) search results and/or vertical search results are integrated together within the set of search results or on a search results page. For example, vertical search results may be integrated into general (e.g., Web) search results within a search results page, or vice-versa, i.e., general search results may be integrated into vertical search results within a search results page. Thus, in some embodiments, general search results and vertical search results may be aggregated and ranked relative to each other. In alternative embodiments, a plurality of search results may include only general search results or only vertical search results, e.g., search results from a particular vertical domain of interest.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6 depicts a flowchart of a method for updating the search index of FIG. 2, the method being executed by the system of FIG. 1 in accordance with non-limiting embodiments of the present technology.

DETAILED DESCRIPTION

Figure 1:
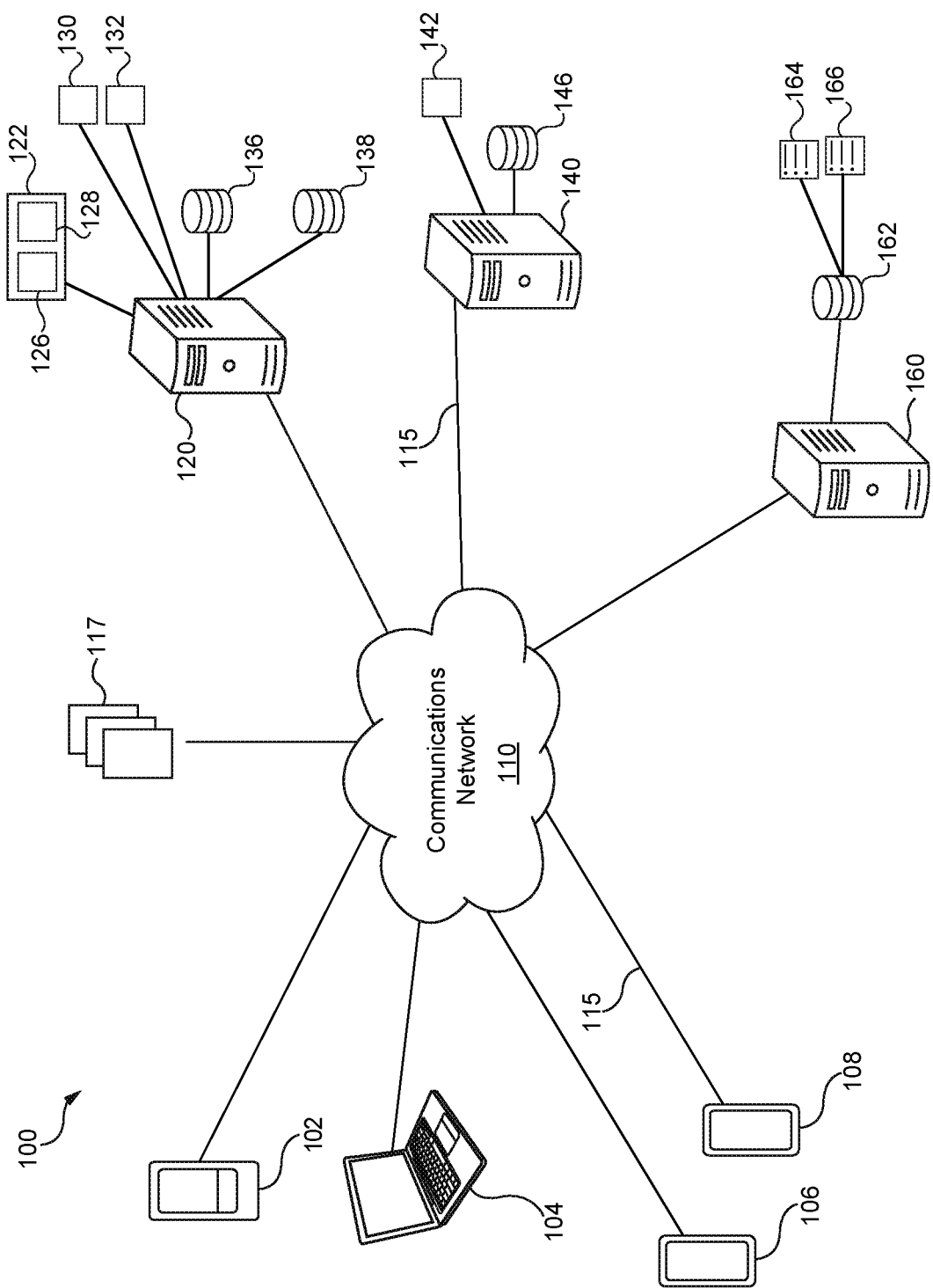
FIG. 1 depicts a schematic diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is depicted a system 100, the system 100 implemented according to non-limiting embodiments of the present technology. The system 100 comprises a first client device 102, a second client device 104, a third client device 106, and a fourth client device 108 coupled to a communications network 110 via a respective communication link 115 (only one numbered in FIG. 1). The system 100 comprises an indexing server 120, a search engine server 140, and a tracking server 160 coupled to the communications network 110 via their respective communication link 115 (only one numbered in FIG. 1). In some embodiments of the present technology, the indexing server 120, the search engine server 140, and the tracking server 160, may be implemented as a single server.

As an example only, the first client device 102 may be implemented as a smartphone, the second client device 104 may be implemented as a laptop, the third client device 106 may be implemented as a smartphone and the fourth client device 108 may be implemented as a tablet. In some non-limiting embodiments of the present technology, the communications network 110 can be implemented as the Internet. In other embodiments of the present technology, the communications network 110 can be implemented differently, such as any wide-area communications network, local-area communications network, a private communications network and the like.

How the given communication link 115 is implemented is not particularly limited and will depend on how the associated one of the first client device 102, the second client device 104, the third client device 106 and the fourth client device 108 are implemented. Merely as an example and not as a limitation, in those embodiments of the present technology where at least one of the first client device 102, the second client device 104, the third client device 106 and the fourth client device 108 is implemented as a wireless communication device (such as a smart-phone), the associated one of the communication link 115 can be implemented as a wireless communication link (such as but not limited to, a 3G communications network link, a 4G communications network link, a Wireless Fidelity, or WiFi® for short, Bluetooth® and the like). In those examples, where at least one of the first client device 102, the second client device 104, the third client device 106 and the fourth client device 108 are implemented respectively as laptop, smartphone, tablet computer, the associated communication link 115 can be either wireless (such as the Wireless Fidelity, or WiFi® for short, Bluetooth® or the like) or wired (such as an Ethernet based connection).

It should be expressly understood that implementations for the first client device 102, the second client device 104, the third client device 106, the fourth client device 108, the communication link 115 and the communications network 110 are provided for illustration purposes only. As such, those skilled in the art will easily appreciate other specific implementational details for the first client device 102, the second client device 104, the third client device 106, the fourth client device 108 and the communication link 115 and the communications network 110. As such, by no means, examples provided herein above are meant to limit the scope of the present technology.

While only the first client device 102, the second client device 104, the third client device 106 and the fourth client device 108 are illustrated, it is contemplated that any number of client devices could be connected to the system 100. It is further contemplated that in some implementations, the number of client devices included in the system 100 could number in the tens or hundreds of thousands.

Indexing Server

Also coupled to the communications network 110 is the above-mentioned indexing server 120. The indexing server 120 can be implemented as a conventional computer server.

In an example of an embodiment of the present technology, the indexing server 120 can be implemented as a Dell™ PowerEdge™ Server running the Microsoft™ Windows Server™ operating system. Needless to say, the indexing server 120 can be implemented in any other suitable hardware and/or software and/or firmware or a combination thereof. In the depicted non-limiting embodiment of present technology, the indexing server 120 is a single server. In alternative non-limiting embodiments of the present technology, the functionality of the indexing server 120 may be distributed and may be implemented via multiple servers. In other embodiments, the functionality of the indexing server 120 may be implemented completely or partially by the search engine server 140. In some embodiments of the present technology, indexing server 120 is under control and/or management of a search engine operator. Alternatively, the indexing server 120 can be under control and/or management of another service provider.

Generally speaking, the purpose of the indexing server 120 is to (i) crawl the Web and retrieve documents, such as a plurality of documents 117; (ii) process the plurality of documents 117; and (iii) index at least a portion of the processed plurality of documents 117 in a search index database 146 of the search engine server 140; and (iv) update the search index database 146 of the search engine server 140.

The indexing server 120 executes a plurality of crawlers 122, a parser 130, a first MLA 132, and is connected to a crawling database 136, and a preindexing database 138.

The plurality of documents 117 may be hosted by various computer systems accessible over the communication network 110, for example. The nature of the plurality of documents 117 is not particularly limited. In the context of the present specification, the plurality of documents 117 may also be referred to as "a plurality of web pages", "web pages", "web documents" or simply "documents". However, it is contemplated that a given one of the plurality of documents 117 may be any form of structured digital information that can be retrieved or accessed via a corresponding Universal Resource Locator (URL), without departing from the scope of the present technology.

Broadly speaking, a given one of the plurality of documents 117 may contain one or more sentences. A given one of the plurality of documents 117, can be, for example, a web page containing text and/or images (such as, for example, a news article recently published and related to some breaking news). Another given one of the plurality of documents 117, can be, as another example, a digital version of a book (such as, for example, a digital version of "Pride and Prejudice" by Jane Austin). Another given one of the plurality of documents 117, can be, as another example, an article on Wikipedia™, which can be updated from time to time.

It is contemplated that at least some of the plurality of documents 117 may have been recently created (or updated) or otherwise may have been recently made accessible over the communication network 110. Indeed, a very large number of web pages are created or otherwise made accessible over the communication network 110 everyday and, as such, there may be a need to index at least some of these web pages so as to provide their content to users of a given search engine.

It should be noted that at least some of the plurality of documents 117 may be "fresh" web pages, such as web pages having fresh content that is likely to be updated relatively frequently (e.g., weather), while at least some others of the plurality of documents 117 may be "stagnant" web pages, such as web pages having stagnant content that is less likely to change or be changed with less frequent intervals (e.g., Wikipedia article on the Canadian constitution). On the one hand, usefulness of fresh content to users of a given search engine usually (i) peaks close to the moment of its creation and (ii) drops after some period of time. On the other hand, usefulness of stagnant content to users of the given search engine usually (i) is lower near the moment of its creation than usefulness of fresh content near the moment of its creation but (ii) is somewhat constant throughout time.

It is contemplated that at least some of the plurality of documents 117 may have been previously indexed, while at least some others of the plurality of documents 117 may not have been previously indexed. For example, the plurality of documents 117 may comprise "new" web pages which have not been previously indexed. In another example, the plurality of documents 117 may comprise "old" web pages which have been previously indexed. In yet another example, the plurality of documents 117 may comprise "updated" web pages which are, in a sense, "updated" versions of old web pages, where the content of the updated version of the web page is different from the content of the old version of the web page which has been previously indexed.

The plurality of crawlers 122 includes main crawlers 124 and express crawlers 126. The main crawlers 124 are configured to crawl the plurality of documents 117 on the Web starting from a list of URLs to visit (not depicted), where hyperlinks in the documents are also identified and added to the list to visit. The express crawlers 126 are configured to perform express indexing of "fresh" documents (which may be included the plurality of documents 117) that appeared on the Web just before the crawling procedure, such that the fresh documents are also available for indexing. The main crawlers 124 and the express crawlers 126 also include respective schedulers (not depicted) which create schedules and orders of documents to crawl on the Web. The plurality of crawlers 122, including the main crawlers 124 and the express crawlers 126 generally download the plurality of documents 117, and store the plurality of documents 117 in the crawling database 136 for further processing thereof, as will be described in more detail herein below.

The parser 130 is generally configured to parse the plurality of documents 117 stored in the crawling database 136 and extract information therefrom, such as but not limited to index terms, and hyperlinks. The parser 130 generally clears markup language from the crawled documents, such that text information can be extracted and later analyzed or used directly for indexing. The parser 130 may further extract a plurality of features from the documents, such as features used for ranking (ranking features), URL features, click features, document features, and the like. In some embodiments, the parser 130 may save the extracted information as feature vectors in the preindexing database 138. In other embodiments, the indexing server 120 may execute a feature extractor (not depicted) for extracting the features of the plurality of documents 117 from the crawling database 136.

The first MLA 132 is configured to select at least a portion of the plurality of documents 117 for inclusion in the search index database 146 of the search engine server 140 based on feature vectors of the plurality of documents 117, as well as other information associated with plurality of documents 117, the feature vectors being stored in the preindexing database 138.

The indexing server 120 is configured to update the search index database 146 upon receiving an indication for an update, or at predetermined intervals of time. How the indexing server 120 updates the search index database 146 will be explained in more detail herein below.

Search Engine Server

Also coupled to the communications network 110 is the aforementioned search engine server 140. The search engine server 140 can be implemented as a conventional computer server. In an example of an embodiment of the present technology, the search engine server 140 can be implemented as a Dell™ PowerEdge™ Server running the Microsoft™ Windows Server™ operating system. Needless to say, the search engine server 140 can be implemented in any other suitable hardware and/or software and/or firmware or a combination thereof. In the depicted non-limiting embodiment of present technology, the search engine server 140 is a single server. In alternative non-limiting embodiments of the present technology, the functionality of the search engine server 140 may be distributed and may be implemented via multiple servers. In some embodiments of the present technology, the search engine server 140 is under control and/or management of a search engine operator. Alternatively, the search engine server 140 can be under control and/or management of a service provider.

Generally speaking, the purpose of the search engine server 140 is to (i) execute searches; (ii) execute analysis of search results and perform ranking of search results in response to a search request; (iii) group results and compile the search engine result page (SERP) to be outputted to an electronic device (such as one of the first client device 102, the second client device 104, the third client device 106 and the fourth client device 108), the electronic device having been used to submit the search request that resulted in the SERP.

How the search engine server 140 is configured to execute searches is not particularly limited. Those skilled in the art will appreciate several ways and means to execute the search using the search engine server 140 and as such, several structural components of the search engine server 140 will only be described at a high level. The search engine server 140 may maintains the search index database 146.

The search engine server 140 is configured to perform general domain searches, as is known to those skilled in the art. For example, a general domain search is not confined to search a specific category of results but is able to provide all results that best match the search query. Such a general (category-independent) search by the search engine server 140 may return search results that include non-category specific digital content as well as category specific digital content, such as images, videos, news, shopping, blogs, books, places, discussions, recipes, tickets, biographical information, patents, stocks, timelines, etc., and other digital content that is closely related and directed toward a certain type of digital content. As an example, a general domain search may be a WWW search. A search performed in a general domain generates a "general search result" or "general search result item." Such general search results are also referred to herein as "web results." Typically, a web result includes a website link and a snippet that summarizes content of the website. A user may select a website link of a web result to navigate to the webpage related to the user search query. The terms "general search result" and "general search result item" are used interchangeably herein, as are the terms "search result" and "search result item."

The search engine server 140 is also configured to perform vertical domain searches. For example, a vertical domain may be an information domain containing specialized content, such as content of a single type (e.g., media type, genre of content, topicality, etc.). A vertical domain thus includes a specific subset of a larger set of data, for example, a specific subset of web data. For example, a vertical domain may include specific information such as images, videos, news, shopping, blogs, books, places, discussions, recipes, tickets, biographical information, patents, stocks, timelines, etc. A search performed in a vertical domain generates a "vertical search result" or a "vertical search result item". Such vertical search results are also referred to herein as "verticals" and "vertical results." The terms "vertical search result" and "vertical search result item" are used interchangeably herein.

The search engine server 140 is configured to generate a ranked search results list, including the results from the general domain search and the vertical domain search. The search engine server may execute one or more MLAs 142 for ranking documents to generate the ranked search results list.

Multiple algorithms for ranking the search results are known and can be implemented by the search engine server 140.

Just as an example and not as a limitation, the one or more MLAs 142 may rank the documents by relevancy to the user-submitted search query based on some or all of: (i) how popular a given search query is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 140 can thus calculate and assign a relevance score (based on, but not limited to, the different criteria listed above) to each search result obtained in response to a user-submitted search query and generate a SERP, where search results are ranked according to their respective relevance scores.

The search engine server 140 typically maintains the above-mentioned search index database 146.

The purpose of the search index database 146 is to index documents (or indication of documents), such as, but not limited to, web pages, images, videos, Portable Document Format (PDF) documents, Microsoft Word™ documents, Microsoft PowerPoint™ documents, that have been, as an non-limiting example, selected by the first MLA 132. In some embodiments of the present technology, the search index database 146 is maintained in a form of posting lists. As such, when a user of one of the first client device 102, the second client device 104, the third client device 106, and the fourth client device 108 inputs a search query and performs a search on the search engine server 140, the search engine server 140 analyzes the search index database 146 and retrieves documents that contain terms of the query, and ranks them according to a ranking algorithm.

Tracking Server

Also coupled to the communications network 110 is the above-mentioned tracking server 160. The tracking server 160 can be implemented as a conventional computer server. In an example of an embodiment of the present technology, the tracking server 160 can be implemented as a Dell™ PowerEdge™ Server running the Microsoft™ Windows Server™ operating system. Needless to say, the tracking server 160 can be implemented in any other suitable hardware and/or software and/or firmware or a combination thereof. In the depicted non-limiting embodiment of present technology, the tracking server 160 is a single server. In alternative non-limiting embodiments of the present technology, the functionality of the tracking server 160 may be distributed and may be implemented via multiple servers. In other embodiments, the functionality of the tracking server 160 may be implemented completely or partially by the search engine server 140. In some embodiments of the present technology, the tracking server 160 is under control and/or management of a search engine operator. Alternatively, the tracking server 160 can be under control and/or management of another service provider.

Generally speaking, the purpose of the tracking server 160 is to track user interactions with the search engine server 140, such as search queries and terms entered by users, and documents subsequently accessed by the users (such as users of the first client device 102, the second client device 104, the third client device 106, and the fourth client device 108). The tracking server 160 may track user interactions (such as, for example, click-through data) when users perform general domain searches and vertical domain searches on the search engine server 140.

Non-limiting examples of user interactions tracked or computed by the tracking server 160 include:

Loss/Win: was the document clicked in response to the search query or not.

Dwell time: time a user spends on a document before returning to the SERP.

Long/short click: was the user interaction with the document long or short, compared to the user-interaction with other documents on the SERP.

Click-through rate (CTR): Number of clicks on an element divided by the number of times the element is shown (impressions).

Naturally, the above list is non-exhaustive and may include other types of user-interaction parameters without departing from the scope of the present technology.

The tracking server 160 may save the tracked user interactions in a tracking database 162. In the depicted embodiment, the tracking database 162 includes a search query log 164, and a user interaction log 166.

The purpose of the search query log 164 is to maintain a log of searches submitted on the search engine server 140. More specifically, the search query log 164 may maintain a list of queries, each respective query of the list having respective search terms, the associated documents that were listed by the search engine server 140 in response to the respective search query, a number of submissions over time of the respective query (referred to as a frequency of past use herein below), and may also contain a list of users (or group of users) identified by anonymous IDs (or without an ID altogether) and the respective documents they have clicked on after submitting the respective search query. In some embodiments, the search query log 164 may be updated every time a new search is performed on the search engine server 140. In other embodiments, the search query log 164 may be updated at predetermined times. In some embodiments, there may be a plurality of copies of the search query log 164, each corresponding to the search query log 164 at different points in time.

The manner in which the user interaction log 166 is structured is not limited. The user interaction log 166 can be linked to the search query log 164, and can list user-interaction parameters as tracked by the tracking server 160 after a user has submitted a search query and clicked on one or more documents in a SERP on the search engine server 140. As a non-limiting example, the user interaction log 166 may maintain: (i) a reference to a respective document or an indication thereof, which may be identified, as a non-limiting example, by an ID number or an URL; (ii) a respective list of queries, where each respective query of the list of respective queries is associated with the respective document, and where each of the respective queries has been used by one or more users to access the respective document; and (iii) a respective plurality of user-interaction parameters per query (if the document was interacted with), which are indicative of user-interactions with the respective document by users having submitted the respective query of the list of queries. The user interaction log 166 may further include respective timestamps associated with the respective user-interactions, and other statistical data. In some embodiments, the search query log 164 and the user interaction log 166 may be implemented as a single log.

Generally speaking, data from the tracking database 162 (including data from the user interaction log 166) may be acquired by at least one of the search engine server 140, and the tracking server 160, in a synchronous manner (i.e. at predetermined time intervals), or in an asynchronous manner (e.g. upon receipt of an indication).

In alternative non-limiting embodiments of the present technology, the functionality of the tracking server 160 and the search engine server 140 can be implemented by a single server.

The purpose of the search query log 164 is to maintain a log of searches submitted on the search engine server 140. More specifically, the search query log 164 may maintain a list of queries, each respective query of the list having respective search terms, the associated documents that were listed by the search engine server 140 in response to the respective search query, a number of submissions over time of the respective query (referred to as a frequency of past use herein below), and may also contain a list of users (or group of users) identified by anonymous IDs (or without an ID altogether) and the respective documents they have clicked on after submitting the respective search query. In some embodiments, the search query log 164 may be updated every time a new search is performed on the search engine server 140. In other embodiments, the search query log 164 may be updated at predetermined times. In some embodiments, there may be a plurality of copies of the search query log 164, each corresponding to the search query log 164 at different points in time.

Figure 2:
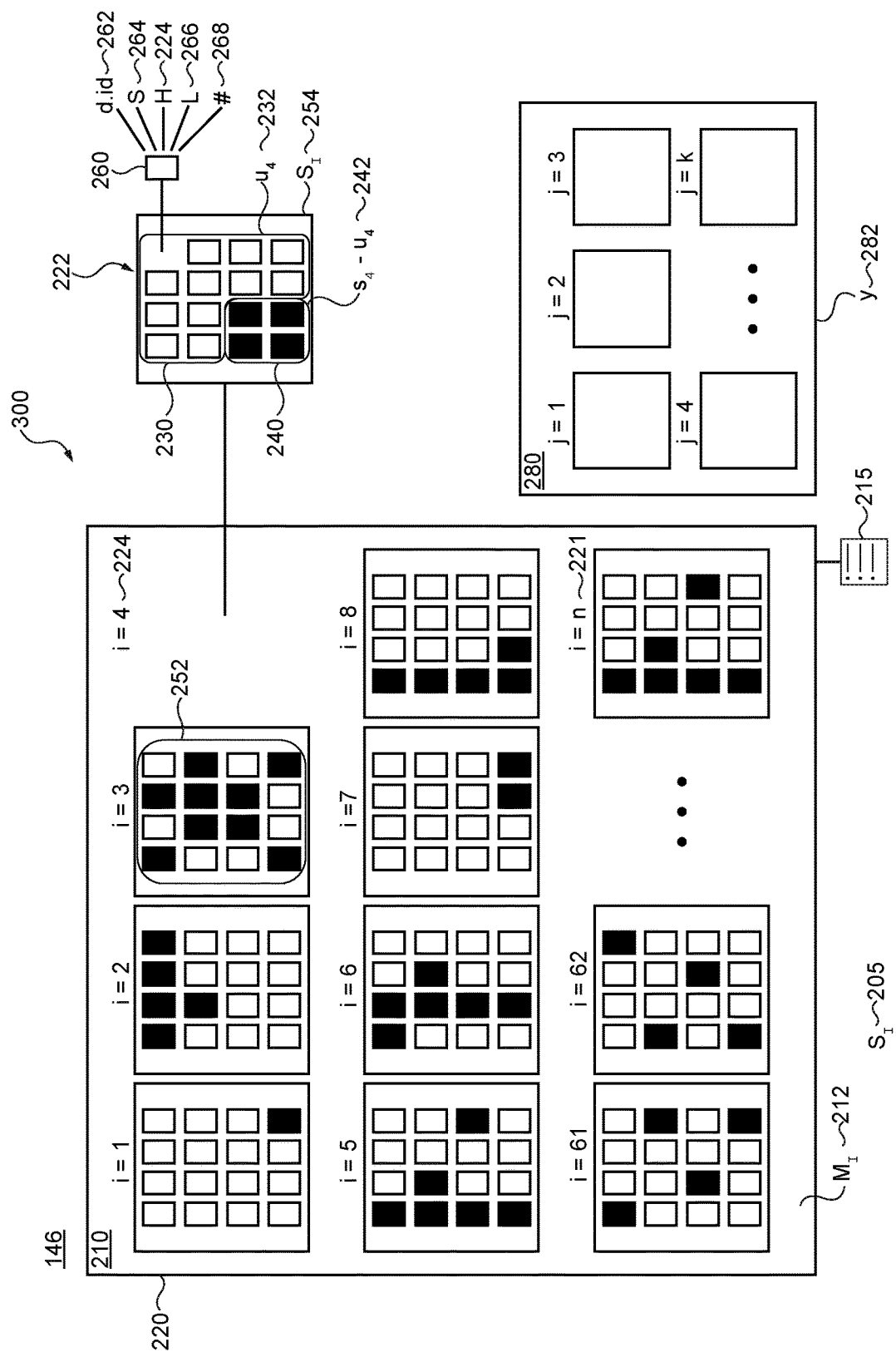
FIG. 2 depicts a schematic diagram of a structure of a search index implemented by system of FIG. 1 in accordance with non-limiting embodiments of the present technology.
Figure 3:
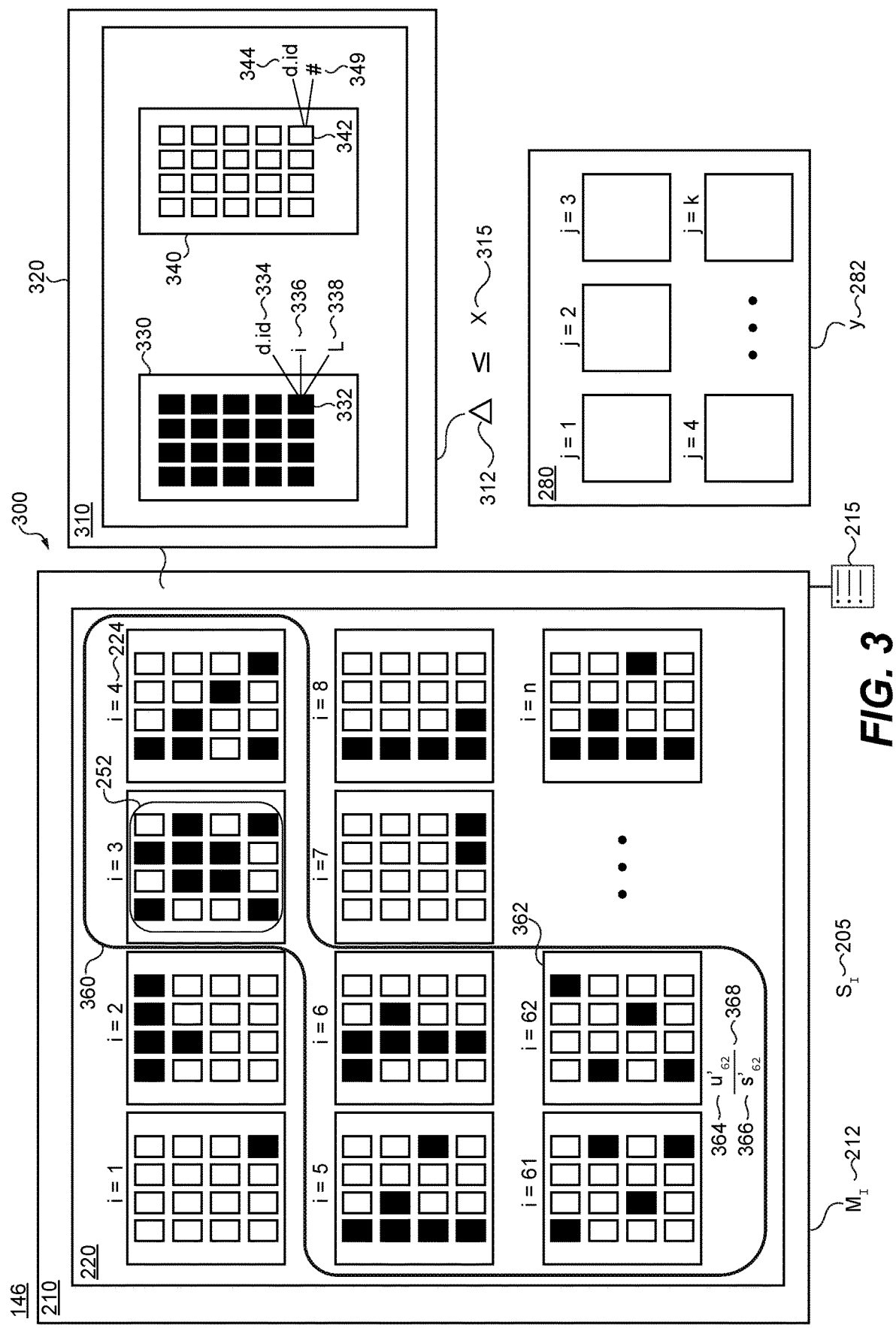
FIG. 3 depicts a schematic diagram an update process of the search index of FIG. 2, the update process being executed by the system of FIG. 1 in accordance with non-limiting embodiments of the present technology.
Figure 4:
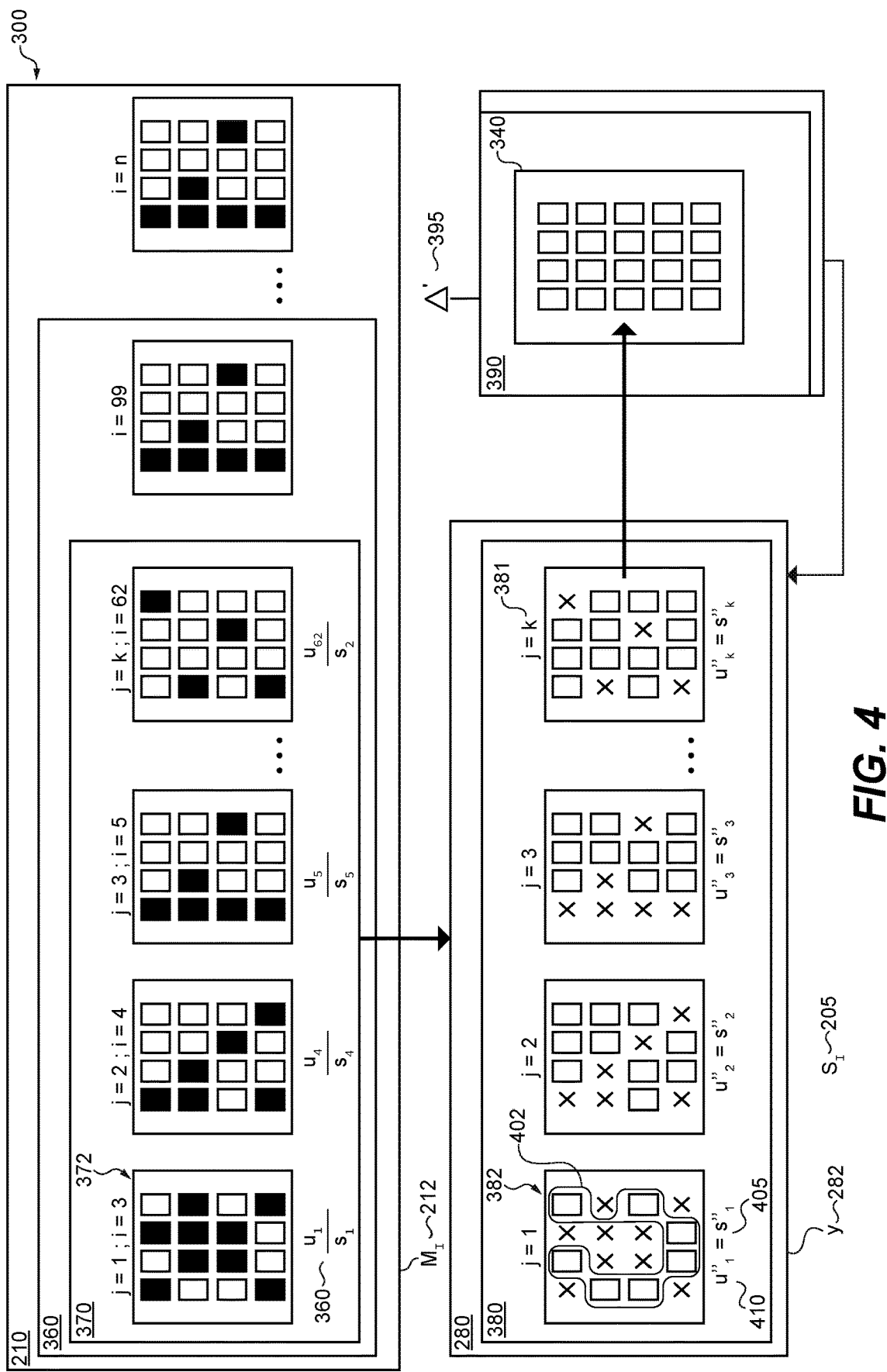
FIG. 4 depicts a schematic diagram of another stage of the update process of FIG. 3, the update process being executed by the system of FIG. 1 in accordance with non-limiting embodiments of the present technology.
Figure 5:
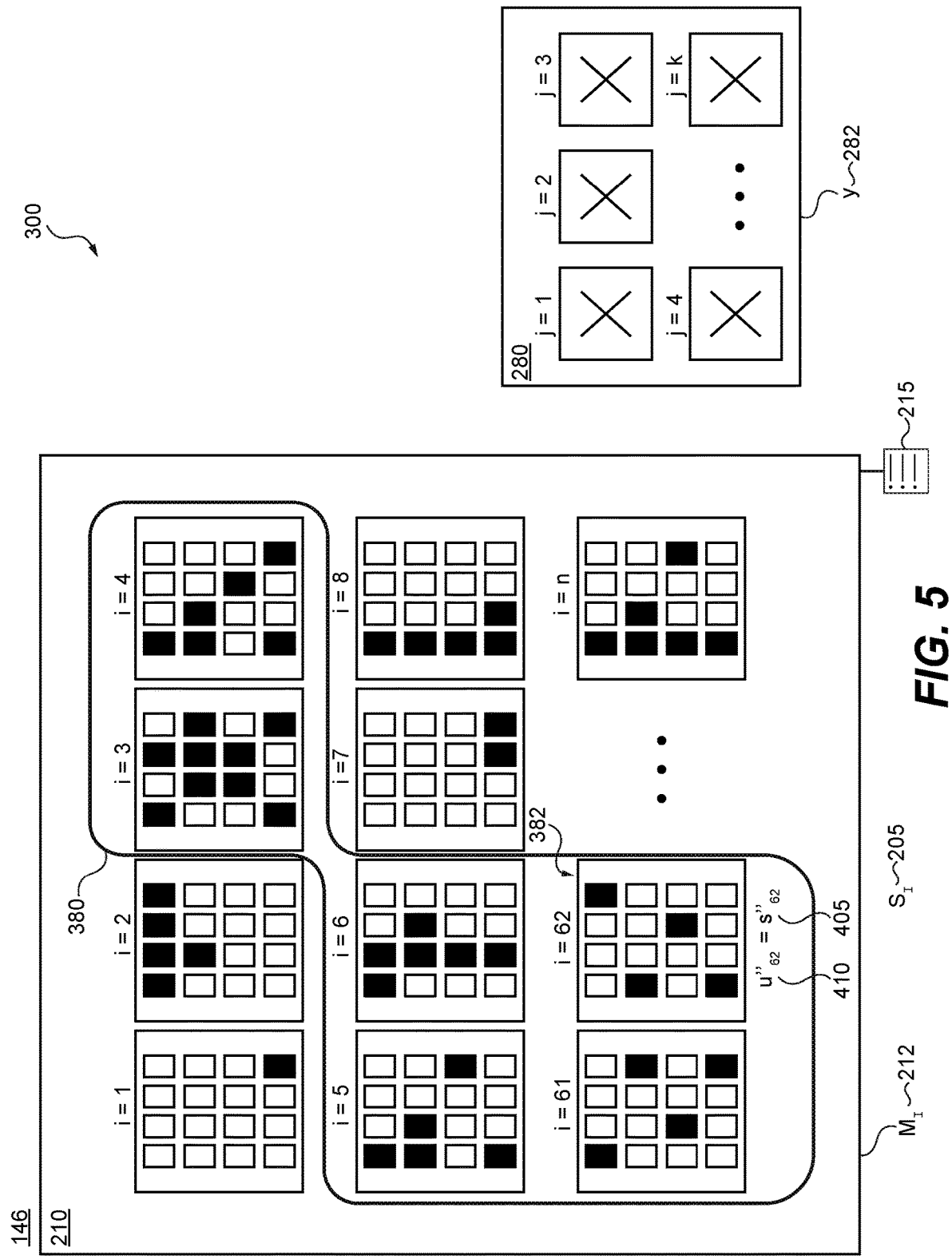
FIG. 5 depicts a schematic diagram of another stage of the update process of FIG. 3, the update process being executed by the system of FIG. 1 in accordance with non-limiting embodiments of the present technology.

Reference is now being made to FIG. 2, which depicts a schematic diagram of a structure of the search index database 146, the search index database 146 being depicted in accordance with non-limiting embodiments of the present technology.

The search index database 146 includes a main portion 210, and an update portion 280. Generally speaking, the search index database 146 has a size limit 205, the size limit 205 being an available storage space in a storage medium of the indexing server 120.

The main portion 210 of the search index database 146 stores a plurality of indexed documents 250. The main portion 210 is "an active" version of the search index database 146, the main portion 210 being used by the search engine server 140, including the one or more MLAs 142, for retrieving documents of the plurality of indexed documents 250 to be presented as search results to users in response to queries in real-time. The main portion 210 of the search index database 146 has a main size limit 212. Naturally, the main size limit 212 is below the size limit 205 of the search index database 146.

The update portion 280 of the search index database 146 is configured to be used for updating documents, such as the plurality of indexed documents 250, included in the main portion 210 of the search index database 146. In the context of the present description, "updating" a document in the main portion 210 of the search index database 146 may include: deletion of a given indexed document 260 of the plurality of indexed documents 250, addition of a new document to the plurality of indexed documents 250, and modification of the given indexed document 260 in the plurality of indexed documents 250.

The update portion 280 may be a "temporary" storage used for updating documents in the main portion 210 of the search index database 146. The update portion 280 has an update size limit 282, the update size limit 282 being equal to y, the update size limit 282 being below the main size limit 212. As a non-limiting example, the update size limit 282 may be 20% of the main size limit 212 or any other suitable number selected by the operator of the search index database 146. How the update size limit 282 y is determined will be explained in more detail herein below.

In some non-limiting embodiments of the present technology, the update portion 280 may be located in a volatile memory of the indexing server 120. How the update portion 280 is used to update documents in the main portion 210 will be explained in more detail herein below.

For the purpose of simplification of the present description, it should be considered that on average, a number of the plurality of indexed documents 250 in the main portion 210 of the search index database 146 is constant, i.e. the number of documents in the plurality of indexed documents 250, after addition of new documents and deletion of documents is about the same. In other words, the number of the plurality of indexed documents 250 is constant due to the size limit 205 of the search index database 146 of the indexing server 120. However, as it may be understood by those skilled in the art, additional storage space may be added periodically to the indexing server 120, and consequently the size limit 205 of the search index database 146 may increase, and the number of the plurality of indexed documents 250 may also increase.

The main portion 210 is divided into a plurality of portions or chunks 220, the plurality of chunks 220 including a predetermined number of chunks 221, which may be expressed as n. How the predetermined number of chunks 221 of the plurality of chunks 220 is determined will be explained in more detail herein below.

As stated previously, the main portion 210 of the search index database 146 includes the plurality of indexed documents 250, the plurality of indexed documents 250 having been divided among the plurality of chunks 220. A given chunk 222 of the plurality of chunks 220 includes a respective portion of indexed documents 252 of the plurality of indexed documents 250. The given chunk 222 has a respective total size 254, the respective total size 254 being a sum of individual size of indexed documents in the respective portion of indexed documents 250.

The respective total size 254 of the given chunk 222 may be expressed as:

$$s_i \quad (1)$$

Where s is the respective total size 254, and i is the chunk identifier 224 of the given chunk 222.

Generally, the given indexed document 260 in the respective portion of indexed documents 252 of the given chunk 222 has:
 a respective document identifier 262;
 a respective size 264;
 a chunk identifier 224 of the given chunk 222;
 a respective location 266 in the given chunk 222; and
 respective document information 268.

The respective document information 268 includes information such as, but not limited to:
 date of creation of the given indexed document 260,
 date of modification of the given indexed document 260,
 date of retrieval of the given indexed document 260 (i.e. when the given indexed document 260 was last presented as a search result in response to a query on the search engine server 140),
 user interactions with the given indexed document 260 (e.g. number of clicks, CTR, etc.),
 a type of the given indexed document 260 (e.g. news article, encyclopedia entry, presentation, etc.),
 index terms of the given indexed document 260,
 ranking features of the given indexed document 260, and the like.

The respective document information 268 may be acquired at least partially from the search query log 164, and/or the user interaction log 166 at predetermined intervals of time and stored in the search index database 146, or may be acquired as a non-limiting example when receiving a request for an update and may be stored in the search index database 146.

Accordingly, the indexing server 120 may maintain a list 215 of the plurality of indexed documents 250, the list 215 including, for each given indexed document 260 of the plurality of indexed documents 250, the respective document identifier 262, the respective chunk identifier 224, the respective document location 266 and the respective document information 268. In other words, the list 215 may "map" each given indexed document 260 to the given chunk 222, and include all information associated with the given chunk 222, and the given indexed document 260.

The respective portion of indexed documents 252 in the given chunk 222 includes a respective set of active documents 230, and a respective set of inactive documents 240. Each given indexed document 260 of the given chunk 222 is either part of the set of active documents 230 or the respective set of inactive documents 240. The indexing server 120 may determine that the given indexed document 260 is part of the respective set of active documents 230, or the respective set of inactive documents 240 based on the respective document information 268.

In some non-limiting embodiments of the present technology, the indexing server 120 may "scan" at least a portion of the plurality of chunks 220 to determine if, for the given chunk 222, each given indexed document 260 is part of the respective set of active documents 230, or the respective set of inactive documents 240, based on the respective document information 268. The indexing server 120 may scan at least a portion of the plurality of chunks 220 at predetermined intervals of time, or upon receiving an indication, such as a request for updating one or more documents in the plurality of chunks 220 of the search index database 146. Additionally or alternatively, information about the respective set of active documents 230, and the respective set of inactive documents 240 in each given chunk may be maintained in the list 215. In other non-limiting embodiments of the present technology, each given chunk 222 may maintain information about the respective set of active documents 230, and the respective set of inactive documents 240 in metafields (not depicted) of the given chunk 222.

The respective set of active documents 230 includes documents that are considered "useful" to the search engine server 140. The indexing server 120 may determine that a document is useful to the search engine server 140 based on the respective document information 268. As a non-limiting example, the given indexed document 260 may be in the respective set of active document 230 if the respective document information 268 of the given indexed document 260 satisfies one or more of the following conditions:
 has been recently indexed by the indexing server 120,
 has been recently modified,
 has been presented as a search result in response to a query on the search engine server 140 during a predetermined period of time,
 has received a number of user interaction above a predetermined threshold when presented as a search result on the search engine server 140 during the predetermined period of time.

The respective set of active documents 230 has a respective active size 232, the respective active size 232 being a sum of the respective sizes 264 of documents in the respective set of active documents 230.

The respective active size 232 of the respective set of active documents 230 of the given chunk 222 may be expressed as:

$$u_i \quad (2)$$

Where u is the respective active size 232 of the respective set of active documents 230, and i is the chunk identifier 224 of the given chunk 222.

The respective set of inactive documents 240 includes documents that are considered inactive or not useful to the search engine server 140. The indexing server 120 may determine that a document is inactive and/or not useful to the search engine server 140 based on the respective document information 268. As a non-limiting example, the given indexed document 260 may be in the respective set of inactive documents 240 if the respective document information 268 of the given indexed document 260 satisfies one or more of the following conditions:
  has not been recently updated,
  has not been retrieved by the search engine server 140 to be presented as a search result in response to a query during a predetermined period of time,
  has received a number of user interactions such as clicks below a predetermined threshold when presented as a search result on the search engine server 140 during the predetermined period of time.

The respective set of inactive documents 240 has a respective inactive size 242, the respective inactive size 242 being a difference between the total size 254 and the respective active size 232 which may be expressed as:

$$s_i - u_i \quad (3)$$

Where s is the respective total size 254, u is the respective active size 232, and i is the chunk identifier 224 of the given chunk 222.

In some embodiments, the given chunk 222 may only have a respective set of active documents 230, or a respective set of inactive documents 240.

Having described, with reference to FIG. 2, how the search index database 146 is structured into the plurality of chunks 220, continuing reference is now being made to FIG. 2 to FIG. 5, which depict schematic diagrams of an update process 300 of the search index database 146 in accordance with non-limiting embodiments of the present technology.

Generally speaking, the request 310 to update the set of documents 320 may be received by the indexing server 120. The request 310 may be transmitted by the search engine server 140 at predetermined intervals of time. In some non-limiting embodiments of the present technology, the request 310 to update the set of documents 320 may be received after completion of a crawling procedure by the plurality of crawlers 122, where the request 310 may include newly crawled documents, such as newly crawled documents from the plurality of digital documents 117. In other words, the request 310 to update the set of documents 320 may be received after the crawling procedure executed by the plurality of crawlers 122 determines that some documents have been updated, deleted or new document have appeared.

The request 310 to update the set of documents 320 generally includes: deletion of a first subset of documents 330 from the search index database 146, and addition of a second subset of documents 340 to the search index database 146. For the purpose of the present specification, documents to be modified (i.e. documents present in the search index database 146 that have been modified by their operator(s)) are included in both the first subset of documents 330, and the second subset of documents 340. In other words, documents that have been modified may have their "old" version deleted from the search index database 146, and their "new" version added to the search index database 146, and the list 215 may be updated accordingly to reflect the changes.

While the request 310 is illustrated with the first subset of documents 330 to delete, and the second subset of documents 340 to add, it should be understood that that the request 310 may only include an indication of the first subset of documents 330 and an indication the second subset of documents 340 in a form of a list of changes, and the second subset of documents 340 to add may be retrieved from the preindexing database 138 or another database (not depicted) and added to the search index database 146 at the end of the update process 300.

A request size 312 of the request 310 to update the set of documents 320 may generally be equal to, or below a predetermined size threshold 315, which may be expressed as:

$$\Delta \leq x \quad (4)$$

Where Δ is the request size 312 of the request 310 to update the set of documents 320, and x is the predetermined size threshold 315.

The request size 312 of the request 310 may be determined based on a sum of the sizes of the documents in the set of documents 320. In other words, the request size 312 may be a sum of sizes documents in the second subset of documents 340 (which will be added to the search index database 146), minus a sum of sizes of documents in the first subset of documents 330 (which will be removed from the search index database 146).

The predetermined size threshold 315 may be expressed as a percentage of the size limit 205 of the search index database 146. As a non-limiting example, the predetermined size threshold 315 may be 3%. How the predetermined size threshold 315 x is determined will be explained in more detail herein below.

In some embodiments, the request 310 to update the set of documents 320 may be above the predetermined size threshold 315, and the indexing server 120 may divide the set of documents 320 into a plurality of subsets (not depicted), such that each subset is below the predetermined size threshold 315. The indexing server 120 may then perform the update for each of the plurality of subsets sequentially.

A given document to be deleted 332 in the first subset of documents 330 may be included in the request 310 for one or more of the following reasons:
  the respective document to be deleted 332 is part of the respective set of inactive documents 240 and does not satisfy predetermined conditions to be considered part of the respective set of active documents 230 (which may be determined based on the respective document information 226 associated with the given indexed document 260),
  the respective document to be deleted 332 is inappropriate,
  the respective document to be deleted 332 has been removed from the Internet,
  the respective document to be deleted 332 has been marked for inappropriate content, illegal content, copyright infringement, and the like.

Naturally, the above list is non-exhaustive, and may include other reasons.

Each respective document to be deleted 332 in the first subset of documents 330 has a respective document identifier 334, a respective chunk identifier 336, and a respective chunk location 338, the respective chunk location 338 being indicative of a location of the respective document to be deleted 332 in the respective chunk.

Each respective document to be added 342 included in the second subset of documents 340 may be included in the request 310 for one or more of the following reasons:
- the respective document to be added 342 has been recently "crawled" or discovered by the plurality of crawlers 122 on the Web, and may be one of the plurality of documents 117,
- the respective document to be added 342 has been recently updated (which may include addition or deletion of information contained in the respective document to be added 342),
- the respective document to be added 342 has not been previously indexed by the indexing server 120 and/or has been determined to be a document "useful" to the search engine server 140 (e.g. by an MLA of the indexing server 120).

Naturally, the above list is non-exhaustive, and may include other reasons.

Each respective document to be added 342 in the second subset of documents 340 has a respective document identifier 344, and respective document information 349.

Upon receiving the request 310, the indexing server 120 may identify, based on at least one of the respective document identifier 334, the respective chunk identifier 336, and the respective chunk location 338 of each respective document to be deleted 332 of the first subset of documents 330, a set of chunks 360, each respective chunk 362 of the set of chunks 360 including at least one respective document to be deleted 332.

The indexing server 120 may compute, for each respective chunk 362 of the set of chunks 360, a respective updated active size 364, a respective updated total size 366, and a respective ratio 368 of the respective updated active size 364 to the respective updated total size 366.

The respective updated active size 364 is a size of the respective set of active documents 230 in the respective chunk 362, the respective updated active size 364 not including sizes of documents of the first subset of documents 330 part of the respective chunk 362. The respective updated active size 364 may be expressed as:

$$u'_i = u_i \cdot (1-x) \quad (5)$$

Where $u'_i$ is the respective updated active size 364, $u_i$ is the respective active size 232, x is the predetermined size threshold 315, and i is the chunk identifier 224 of the respective chunk 362.

The respective updated total size 366 is a size of the respective portion of the plurality of indexed documents 252 in the respective chunk 362, the respective updated total size 366 not including documents of the first subset of documents 330 part of the respective chunk 362. The respective updated total size 366 may be expressed as:

$$s'_i = s_i \cdot (1-x) \quad (6)$$

Where $s'_i$ the respective updated total size 366, $s_i$ is the respective total size 254, x is the predetermined size threshold 315, and i is the chunk identifier 224 of the respective chunk 362.

The indexing server 120 may compute, for each respective chunk 362 of the set of chunks 360, the respective ratio 368 of the respective updated active size 364 to the respective updated total size 366, which may be expressed as:

$$u'_i / s'_i \quad (7)$$

Where $u'_i$ is the respective updated active size 364, and $s'_i$ the respective updated total size 366.

The indexing server 120 may then sort the set of chunks 360 based on the respective ratio 368. The indexing server 120 may select the subset of chunks 370 including a number of k chunks from the set of chunks 360 for duplication in the update portion 280 of the search index database 146 to obtain the subset of candidate chunks 380. The subset of candidate chunks 380 includes a predetermined number of candidate chunks 381 equal to k, the predetermined number of candidate chunks 381 having a minimal respective ratio 368:

$$u'_i / s'_i \rightarrow \min \quad (8)$$

In some embodiments, the subset of candidate chunks 380 may include chunks from the set of chunks 360 having a respective ratio 368 below a predetermined threshold. How the predetermined number of candidate chunks 381 in the subset of candidate chunks 380 is determined will be explained in more detail herein below.

The subset of candidate chunks 380 may be stored temporarily in the update portion 280 of the search index database 146.

The indexing server 120 may delete at least a portion of the first subset of documents 330 from the subset of candidate chunks 380. "At least a portion" of the subset of documents 330 from the subset of candidate chunks 380 is designated to mean deletion of all documents included in the first subset of documents 330 that are also part of the subset of candidate chunks 380, as some of the documents marked for deletion in the first subset of documents 330 may be in chunks from the set of chunks 360 that are not included in subset of candidate chunks 380.

It should be noted that the subset of chunks 370 may not include all chunks having documents marked for deletion in the first subset of documents 330 of the request 310, as the chunks may have the respective ratio 368 that is not among the k lowest respective ratios 360. In some embodiments, remaining documents of the first subset of documents 330 may be added to a subsequent request for updating a set of documents (not depicted). In alternative embodiments, the remaining documents may be marked as being inactive documents (i.e. part of the respective set of inactive documents 240), and may be deleted in subsequent requests for updating the set of document (not depicted) when the associated ones of the chunks are selected for updating. This information about documents to be deleted can be maintained in the list 215 of the plurality of indexed documents 250 (i.e. to show the document to be deleted but not yet deleted as "inactive" or simply remove it from the records of the list 215).

The indexing server 120 may compute a respective updated active size (not depicted) for each respective candidate chunk 382 of the subset of candidate chunks 380, the respective updated active size (not depicted) being a sum of a respective set of active documents (not depicted) in the respective candidate chunk 382, which may be expressed as:

$$u'_j \quad (9)$$

Where u' is the respective updated active size (not depicted), and j is a chunk identifier of the respective candidate chunk 382 in the k chunks of the subset of candidate chunks 380

The indexing server 120 may add all documents included in the subset of candidate chunks 380 to the second subset of documents 340.

The indexing server may form a new request 390, the new request 390 including the second subset of documents 340, the second subset of documents 340 including each respective set of active documents (not depicted) from the subset of candidate chunks 380. The new request 390 may have a new request size 395, which may be expressed as:

$$\Delta' = \Delta + \sum_{j=1}^{k} u'_j \tag{10}$$

Where Δ' is the new request size 395 of the new request 390, Δ is the request size 312 of the request 310, u' is the respective updated active size (not depicted) of the respective candidate chunk 382 in the subset of candidate chunks 380, and j is a respective chunk identifier of a respective candidate chunk 382 from the subset of candidate chunks 380.

The indexing server 120 may distribute the second subset of documents 340 in the subset of candidate chunks 380. The second subset of documents 340 may be distributed in the subset of candidate chunks 380 such that an updated total size 405, and an updated active size 410 of a respective updated set of active documents 402 in each respective chunk 382 of the subset of candidate chunks 380 may be expressed as:

$$u''_j = s''_j = \frac{\Delta'}{k} \tag{11}$$

Where u"$_j$ is the updated active size 410 of the respective updated set of active documents 402 in the respective chunk 382, s"$_j$ is the updated total size 405, Δ' is the new request size 395, and k is the number of chunks in the subset of candidate chunks 380.

It is contemplated that in some non-limiting embodiments of the present technology, the second subset of documents 340 is distributed such that each respective candidate chunk 382 of the subset of candidate chunks 380 has an equal updated active size 410, and an equal updated total size 405. Practically speaking, this may not be the case in every embodiment of the present technology, as documents may have different sizes, and consequently, different techniques may be used to distribute the second subset of documents 340 in the subset of candidate chunks 380. As a non-limiting example, in alternative non-limiting embodiments of the present technology, documents from the second subset of documents 340 could be distributed sequentially in each respective candidate chunk 382 until each respective candidate chunk 382 is "full", i.e. a storage size limit of each respective candidate chunk 382 is reached.

The indexing server 120 may replace the subset of chunks 370 in the main portion 210 with the subset of candidate chunks 380, the subset of candidate chunks 380 including the second subset of documents 340 of the request 310.

As it may be understood, documents in the subset of candidate chunks 380 that were part of the subset of chunks 370 (i.e. before receiving the request 310) that have been redistributed in the subset of candidate chunks 380 may have their respective document identifier 262, and their location 266 updated in the list 215 of the plurality of indexed documents 250 maintained by the indexing server 120. Further, the list 215 of the plurality of indexed documents 250 may be updated to reflect addition of new documents of the second subset of candidate chunks 380.

The indexing server 120 may delete the subset of candidate chunks 380 from the update portion 280 of the search index database 146.

Generally speaking, the predetermined size threshold 315 x, the predetermined number of chunks 221 n, and the predetermined number of candidate chunks 381 k may be chosen such that the update process 300 of the search index database 146 is optimal, i.e. there is a balance between resources required for storage of the search index database 146, and update of the search index database 146, as well as computational time. A "cost" of the update may be expressed as:

$$\min f(x,k,n) \leq y \tag{12}$$

Where x is the predetermined size threshold 315, n is the predetermined number of chunks 221, k is the predetermined number of candidate chunks 381, and y is the update size limit 282.

Generally, a condition determined by developer(s) of the present technology for the predetermined number of candidate chunks 381, and the predetermined number of chunks 331 of the update process 300 is expressed as:

$$g(x)=1 \leq k \leq n \leq 1000 \tag{13}$$

where n is the predetermined number of chunks 221, k is the predetermined number of candidate chunks 381.

As such, an optimal choice of the predetermined size threshold 315 x, the predetermined number of chunks 221 n, and the predetermined number of candidate chunks 381 k allows saving resources and optimizing the update process 300 of the search index database 146. In some embodiments, a MLA may be used to determine, based on past update procedures, the predetermined size threshold 315 x, the predetermined number of chunks 221 n, and the predetermined number of candidate chunks 381 k.

Having described, with reference to FIG. 2 to FIG. 5, how the search index database 146 is structured and updated upon receipt of a request 310 to update a set of documents 320 in accordance with non-limiting embodiments of the present technology, we shall now describe, with reference to FIG. 6, a method 600 for dynamically updating the search index database 146 in accordance with non-limiting embodiments of the present technology.

The method 600 may be executed by the indexing server 120. In some embodiments, the method 600 may be executed by the indexing server 120, and the search engine server 140. In embodiments where at least a portion of the functionality of the indexing server 120 is implemented by the search engine server 140, the method 600 may be executed by the search engine server 140.

The method 600 may begin at step 602.

STEP 602: receiving a request to update a set of documents in the search index, the request to update the set of documents including:
  deletion of a first subset of documents, and
  addition of a second subset of documents to the plurality of documents in the plurality of chunks.

At step 602, the indexing server 120 may receive a request 310 to update a set of documents 320, the request 310 to update the set of documents including: deletion of a first subset of documents 330 from the plurality of chunks 220 of the search index database 146, and addition of a second subset of documents 340 to the plurality of chunks 220 of the search index database 146. In some embodiments, the request 310 to update the set of documents 320 may be transmitted by the plurality of crawlers 122 after a crawling procedure.

The method 600 may then advance to step 604.

STEP 604: computing for each given chunk of a set of chunks from the plurality of chunks, each given chunk including at least one document of the first subset of documents:
- a respective updated active size of a respective set of active documents of the respective portion of the plurality of documents in the given chunk, the respective set of active documents not including the at least one document of the first subset of documents to delete,
- a respective updated total size of the respective portion of the plurality of documents in the given chunk, the respective portion of the plurality of documents not including the at least one document of the first subset of documents to delete, and
- a respective ratio of the respective updated active size to the respective updated total size.

At step 604, the indexing server 120 may compute, for each respective chunk 362 of the set of chunks 360, a respective updated active size 364 of the respective set of active documents 230 in the respective chunk 362, the respective updated active size 364 not including documents in the first subset of documents 330 that are part of the respective chunk 362. The indexing server may compute, for each respective chunk 362 of the set of chunks 360, the respective updated total size 366 of the respective portion of the plurality of indexed documents 252 in the respective chunk 362, the respective updated total size 366 of the respective portion of the plurality of indexed documents 252 not including documents in the first subset of documents 330 that are part of the respective chunk 362. The indexing server 120 may compute, for each respective chunk 362 of the set of chunks 360, the respective ratio 368 of the respective updated active size 364 to the respective updated total size 366.

The method 600 may then advance to step 606.

STEP 606: duplicating, based on the respective ratio, a subset of chunks from the set of chunks to obtain a subset of candidate chunks At step 606, the indexing server 120 may duplicate, a subset of chunks 370 in the update portion 280 of the search index database 146, to obtain a subset of candidate chunks 380. The subset of chunks 370 may be selected from the set of chunks based on the respective ratio 368, each chunk in the subset of chunks 370 having a minimal respective ratio 368. The subset of candidate chunks 380 may include a number k predetermined chunks.

The method 600 may then advance to step 608.

STEP 608: updating, by the server, at least a portion of the set of documents in the subset of candidate chunks, the updating comprising:
- removing, by the server, from the subset of candidate chunks, the first subset of documents for deletion;
- adding, by the server, remaining documents in the subset of candidate chunks to the second subset of documents.
- distributing, by the server, the second subset of documents in the subset of candidate chunks.

At step 608, the indexing server 120 may delete at least a portion of the first subset of documents 330 from the subset of candidate chunks 380. The indexing server 120 may then add all documents included in the subset of candidate chunks 380 in the second subset of documents 340. The indexing server 120 may then distribute the second subset of documents 340 in the subset of candidate chunks 380. Generally, the second subset of documents 340 may be distributed equally in the subset of candidate chunks 380.

The method 600 may then advance to step 610.

STEP 610: replacing, by the server, the subset of chunks with the subset of candidate chunks.

At step 610, the indexing server 120 may replace the subset of chunks 370 with the subset of candidate chunks 380, the subset of candidate chunks 380 including the second subset of documents 340.

The method 600 may then end.

The method 600 may be repeated every time a request to update a set of documents is received at the indexing server 120.

It should be apparent to those skilled in the art that at least some embodiments of the present technology aim to expand a range of technical solutions for addressing a particular technical problem, namely efficiently updating a search index used by a search engine server by dividing the search index into a number of chunks, determining a number of chunks that may be used for updating the search index, a size limit of the updates, while also taking into account a size limit of a search index, which may allow saving storage resources and optimizing the process of updating the search index.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for dynamically updating a search index of a server, the search index being divided into a plurality of chunks, each chunk of the plurality of chunks including a respective portion of a plurality of documents, the method executable by the server, the method comprising:
   receiving, by the server, a request to update a set of documents in the search index, the request to update the set of documents including deletion of a first subset of documents;
   computing, by the server, for each given chunk of a set of chunks from the plurality of chunks, each given chunk including at least one document of the first subset of documents:
      a respective updated active size of a respective set of active documents of the respective portion of the plurality of documents in the given chunk, the respective set of active documents not including the at least one document of the first subset of documents to delete, a respective updated total size of the respective portion of the plurality of documents in the given chunk, the respective portion of the plurality of documents not including the at least one document of the first subset of documents to delete, and a respective ratio of the respective updated active size to the respective updated total size;

duplicating, by the server, based on the respective ratio, a subset of chunks from the set of chunks to obtain a subset of candidate chunks;

updating, by the server, at least a portion of the set of documents in the subset of candidate chunks;

replacing, by the server, the subset of chunks with the subset of candidate chunks.

2. The method of claim 1, wherein the request to update the set of documents in the search index further comprises:

addition of a second subset of documents to the plurality of documents in the plurality of chunks.

3. The method of claim 2, wherein the updating at least the portion of the set of documents in the subset of chunks comprises:

removing, by the server, from the subset of candidate chunks, the first subset of documents for deletion; and distributing, by the server, the second subset of documents in the subset of candidate chunks.

4. The method of claim 3, wherein the method further comprises, prior to the distributing the second subset of documents in the subset of candidate chunks:

adding, by the server, remaining documents in the subset of candidate chunks to the second subset of documents.

5. The method of claim 4, wherein:

the subset of candidate chunks comprises a predetermined number of chunks having a respective lowest ratio.

6. The method of claim 5 wherein each respective document of the plurality of documents of the search index has:

a respective size;

a location in a respective chunk; and an identifier of the respective chunk.

7. The method of claim 6, wherein the distributing the second subset of documents in the subset of candidate chunks comprises, for a given document in the second subset of documents:

updating, by the server, the identifier of the respective chunk of the given document; and updating, by the server, the location of the given document in the respective chunk.

8. The method of claim 7, wherein:

the set of documents to update is associated with an update size; and the update size is below a predetermined update size threshold.

9. The method of claim 8, wherein each given chunk of the plurality of chunks includes:

a respective set of active documents having a respective active size;

a respective set of inactive documents having a respective inactive size; and the respective portion of the plurality of documents having a respective total size.

10. The method of claim 9, wherein the method further comprises, prior to the computing:

determining, by the server, if the update size is above the predetermined update size threshold; and in response to the update size being above the predetermined update size threshold:

dividing, by the server, the set of documents to update into at least two subsets of documents, such that each of the at least two subsets is below the predetermined change size threshold; and performing, by the server, the computing, the duplicating, and the updating for each of the at least two subsets.

11. The method of claim 10, wherein the computing, the duplicating, and the updating is executed offline.

12. The method of claim 10, wherein:

the server is a search engine server; and each respective set of inactive documents in the plurality of chunks of the search index includes at least one of:

documents having received no user interactions in response to any query during a predetermined period of time, and documents not having been presented in response to any query during the predetermined period of time.

13. The method of claim 10, wherein:

the server is connected to a storage medium, the storage medium including a first portion, and a second portion;

the search index is stored in the first portion;

the subset of candidate chunks is stored in the second portion; and a size limit of the first portion is below a size limit of the second portion.

14. A system for dynamically updating a search index, the search index being divided into a plurality of chunks, each chunk of the plurality of chunks including a respective portion of a plurality of documents, the system comprising:

a processor;

a non-transitory computer-readable medium comprising instructions;

the processor, upon executing the instructions, being configured to:

receive a request to update a set of documents in the search index, the request to update the set of documents including deletion of a first subset of documents;

compute for each given chunk of a set of chunks from the plurality of chunks, each given chunk including at least one document of the first subset of documents:

a respective updated active size of a respective set of active documents of the respective portion of the plurality of documents in the given chunk, the respective set of active documents not including the at least one document of the first subset of documents to delete, a respective updated total size of the respective portion of the plurality of documents in the given chunk, the respective portion of the plurality of documents not including the at least one document of the first subset of documents to delete, and a respective ratio of the respective updated active size to the respective updated total size;

duplicate, based on the respective ratio, a subset of chunks from the set of chunks to obtain a subset of candidate chunks;

update at least a portion of the set of documents in the subset of candidate chunks;

replace the subset of chunks with the subset of candidate chunks.

15. The system of claim 14, wherein the request to update the set of documents in the search index further comprises:

addition of a second subset of documents to the plurality of documents in the plurality of chunks.

16. The system of claim 15, wherein to update the at least the portion of the set of documents in the subset of chunks, the processor is configured to:
- remove from the subset of candidate chunks, the first subset of documents for deletion; and
- distribute the second subset of documents in the subset of candidate chunks.

17. The system of claim 16, wherein the processor is further configured to, prior to the distributing the second subset of documents in the subset of candidate chunks:
- add remaining documents in the subset of candidate chunks to the second subset of documents.

18. The system of claim 17, wherein:
- the subset of candidate chunks comprises a predetermined number of chunks having a respective lowest ratio.

19. The system of claim 18 wherein each respective document of the plurality of documents of the search index has:
- a respective size;
- a location in a respective chunk; and
- an identifier of the respective chunk.

20. The system of claim 19, wherein to distribute the second subset of documents in the subset of candidate chunks the processor is configured to, for a given document in the second subset of documents:
- update the identifier of the respective chunk of the given document; and
- update the location of the given document in the respective chunk.

21. The system of claim 20, wherein:
- the set of documents to update is associated with an update size; and
- the update size is below a predetermined update size threshold.

22. The system of claim 21, wherein each given chunk of the plurality of chunks includes:
- a respective set of active documents having a respective active size;
- a respective set of inactive documents having a respective inactive size; and
- the respective portion of the plurality of documents having a respective total size.

23. The system of claim 22, wherein the system is further configured to, prior to the computing:
- determine if the update size is above the predetermined update size threshold; and
- in response to the update size being above the predetermined update size threshold:
  - divide the set of documents to update into at least two subsets of documents, such that each of the at least two subsets is below the predetermined change size threshold; and
  - perform the computing, the duplicating, and the updating for each of the at least two subsets.

24. The system of claim 23, wherein the computing, the duplicating, and the updating is executed offline.

25. The system of claim 22, wherein:
- each respective set of inactive documents in the plurality of chunks of the search index includes at least one of:
- documents having received no user interactions in response to any query during a predetermined period of time, and
- documents not having been presented in response to any query during the predetermined period of time.

26. The system of claim 22, wherein:
- the system is connected to a storage medium, the storage medium including a first portion, and a second portion;
- the search index is stored in the first portion;
- the subset of candidate chunks is stored in the second portion; and
- a size limit of the first portion is below a size limit of the second portion.

* * * * *